(12) United States Patent
Kumar et al.

(10) Patent No.: US 8,937,865 B1
(45) Date of Patent: Jan. 20, 2015

(54) SCHEDULING TRAFFIC OVER AGGREGATED BUNDLES OF LINKS

(71) Applicant: Juniper Networks, Inc., Sunnyvale, CA (US)

(72) Inventors: Nitin Kumar, Fremont, CA (US); Alex Baban, San Jose, CA (US); Surya Nimmagadda, Cupertino, CA (US); Alok Khambatkone, San Jose, CA (US); Saravanan Masilamani, San Jose, CA (US); Anand S. Athreya, San Jose, CA (US); Vipul Deokar, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

(21) Appl. No.: 13/629,326

(22) Filed: Sep. 27, 2012

Related U.S. Application Data

(60) Provisional application No. 61/691,636, filed on Aug. 21, 2012.

(51) Int. Cl.
  *H04L 12/26* (2006.01)
  *H04L 12/803* (2013.01)
(52) U.S. Cl.
  CPC ................................ *H04L 47/125* (2013.01)
  USPC ........................................................ 370/235
(58) Field of Classification Search
  None
  See application file for complete search history.

(56) References Cited

U.S. PATENT DOCUMENTS

| | | | |
|---|---|---|---|
| 6,498,781 B1 * | 12/2002 | Bass et al. | 370/230.1 |
| 7,606,154 B1 | 10/2009 | Lee | |
| 2002/0054567 A1 * | 5/2002 | Fan | 370/230 |
| 2011/0051602 A1 * | 3/2011 | Matthews et al. | 370/235 |
| 2011/0273987 A1 * | 11/2011 | Schlansker et al. | 370/235 |
| 2013/0003549 A1 * | 1/2013 | Matthews et al. | 370/235 |
| 2013/0194914 A1 * | 8/2013 | Agarwal et al. | 370/225 |

OTHER PUBLICATIONS

IEEE Std. 802.3ad-2000, "Amendment to Carrier Sense Multiple Access with Collision Detection (CSMA/CD) Access Method and Physical Layer Specifications—Aggregation of Multiple Link Segments", 2000, 183 pgs.
U.S. Appl. No. 13/162,157, filed Jun. 16, 2011 entitled Active-Active Multi-Homing With Multi-Chassis Pseudowire Link Aggregation.
U.S. Appl. No. 13/340,182, filed Dec. 29, 2011 entitled Scheduling Traffic Over Aggregated Bundles of Links.

* cited by examiner

*Primary Examiner* — Otis L Thompson, Jr.
(74) *Attorney, Agent, or Firm* — Shumaker & Sieffert, P.A.

(57) ABSTRACT

In general, techniques are described for scheduling traffic for delivery over an aggregated bundle of links. A network device comprising an interface and a data plane may implement the techniques. The interface receives packets associated with packet flows. The data plane associates each of the packet flows with a different link of an aggregated bundle of links. The data plane monitors transmission of the packets via the links to determine a representation of an amount of data sent per link. The data plane further determines that bandwidth utilization does not conform to a desired bandwidth utilization based on the determined representation of the amount of data sent per link. The data plane then re-associates the packet flows to different links of the aggregated bundle based on the determination that the bandwidth utilization does not conform to the desired bandwidth utilization.

20 Claims, 7 Drawing Sheets

SCHEDULING TRAFFIC OVER AGGREGATED BUNDLES OF LINKS

This application claims the benefit of U.S. Provisional Patent Application 61/691,636 filed Aug. 21, 2012, the entire content of which is incorporated herein by reference.

TECHNICAL FIELD

The invention relates to network devices and, more particularly, scheduling of traffic with network devices.

BACKGROUND

In computer networks, a network device may be connected to one or more network devices via two or more links. In some cases, these two or more links may be logically grouped or aggregated together to form an "aggregated bundle." For example, one or more routers may be connected to an access node via an aggregate bundle of multiple physical links.

Generally, link aggregation may improve bandwidth in comparison to that of a single link, while also providing connection redundancy. That is, use of multiple links result in an available total bandwidth equal to the combined bandwidth of all of the links. In addition, should one of the links of the aggregated bundle fail, the network device may begin sending traffic to the other network device across the non-failed links of the aggregated bundle, thereby providing redundancy in the form of redundant links for delivery of traffic between two devices. While aggregated bundles may provide for improved bandwidth and redundancy, it is often difficult to ensure that flows of traffic are distributed across of the aggregated links in a manner that ensures efficiently utilizes the bandwidth of each of the aggregated links.

SUMMARY

In general, techniques are described for scheduling traffic over aggregated bundles of two or more links. The techniques may enable network devices, such as routers, to semi-randomly associate or distribute packet flows to different links (e.g., using a hash function) and then monitor delivery of packets of the packet flows to determine an amount of data sent per link of the aggregated bundle of links. This amount of data may be specified as actual byte counts or packet counts sent over each of the links of the aggregated bundle of links. The techniques may then enable the router or other network device to use these byte counts or packet counts to determine when bandwidth utilization of the links becomes unbalanced and, when determined to be unbalanced, accurately re-assign various flows associated with heavy bandwidth utilization to underutilized links of the aggregated bundle of links. In this way, rather than merely assign packet flows to links of the aggregated bundle and depend on the semi-random assignment of packet flows to result in generally balanced bandwidth utilization, the techniques described in this disclosure may provide for a feedback monitoring loop that facilitates a re-balancing operation based on actual utilization of each link.

In one embodiment, a method comprises associating, with a data plane of a network device, packet flows of packets with different links of an aggregated bundle of two or more links, transmitting, with the data plane of the network device, the packets of the packet flows via the different links of the aggregated bundle of two or more links with which the packets are associated and monitoring, with the data plane of the network device, the transmission of the packets via each of the corresponding links of the aggregated bundle of two or more links to determine a representation of an amount of data sent per each of the links of the aggregated bundle of two or more links. The method also comprises determining, with the data plane of the network device, that the bandwidth utilization does not conform to a desired utilization of each of the links of the aggregated bundle of two or more links based on the determined representation of the amount of data sent per link of the aggregated bundle of two or more links and re-associating, with the data plane of the network device, at least one of the packet flows with a different link of the aggregated bundle of the two or more links based on the determination that the bandwidth utilization does not conform to the desired utilization of each of the links of the aggregated bundle of two or more links.

In another embodiment, a network device comprises at least one interface that receives packets associated with packet flows and a data plane that associates each of the packet flows with a different one of an aggregated bundle of two or more links. The at least one interface transmits the packets of the packet flows via the associated link of the aggregated bundle of two or more links. The data plane monitors the transmission of the packets via each of the associated links of the aggregated bundle of two or more links to determine a representation of an amount of data sent per link of the aggregated bundle of two or more links, determines that bandwidth utilization does not conform to a desired bandwidth utilization of each of the links of the aggregated bundle of two or more links based on the determined representation of the amount of data sent per link of the aggregated bundle of two or more links, and re-associates at least one of the packet flows to a different link of the aggregated bundle of the two or more links based on the determination that the bandwidth utilization does not conform to the desired bandwidth utilization of each of the links of the aggregated bundle of two or more links.

In another embodiment, a non-transitory computer-readable medium comprising instructions that, when executed cause one or more processors of a network device to associate packet flows of packets to different links of an aggregated bundle of two or more links, transmit the packets of the packet flows via the associated different links of the aggregated bundle of two or more links, monitor the transmission of the packets via each of the corresponding assigned link of the aggregated bundle of two or more links to determine a representation of an amount of data sent per link of the aggregated bundle of two or more links, determine that bandwidth utilization is unbalanced between the aggregated bundle of two or more links based on the determined representation of the amount of data sent per link of the aggregated bundle of two or more links and re-associate at least one of the packet flows with a different link of the aggregated bundle of the two or more links based on the determination that the bandwidth utilization is unbalanced.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
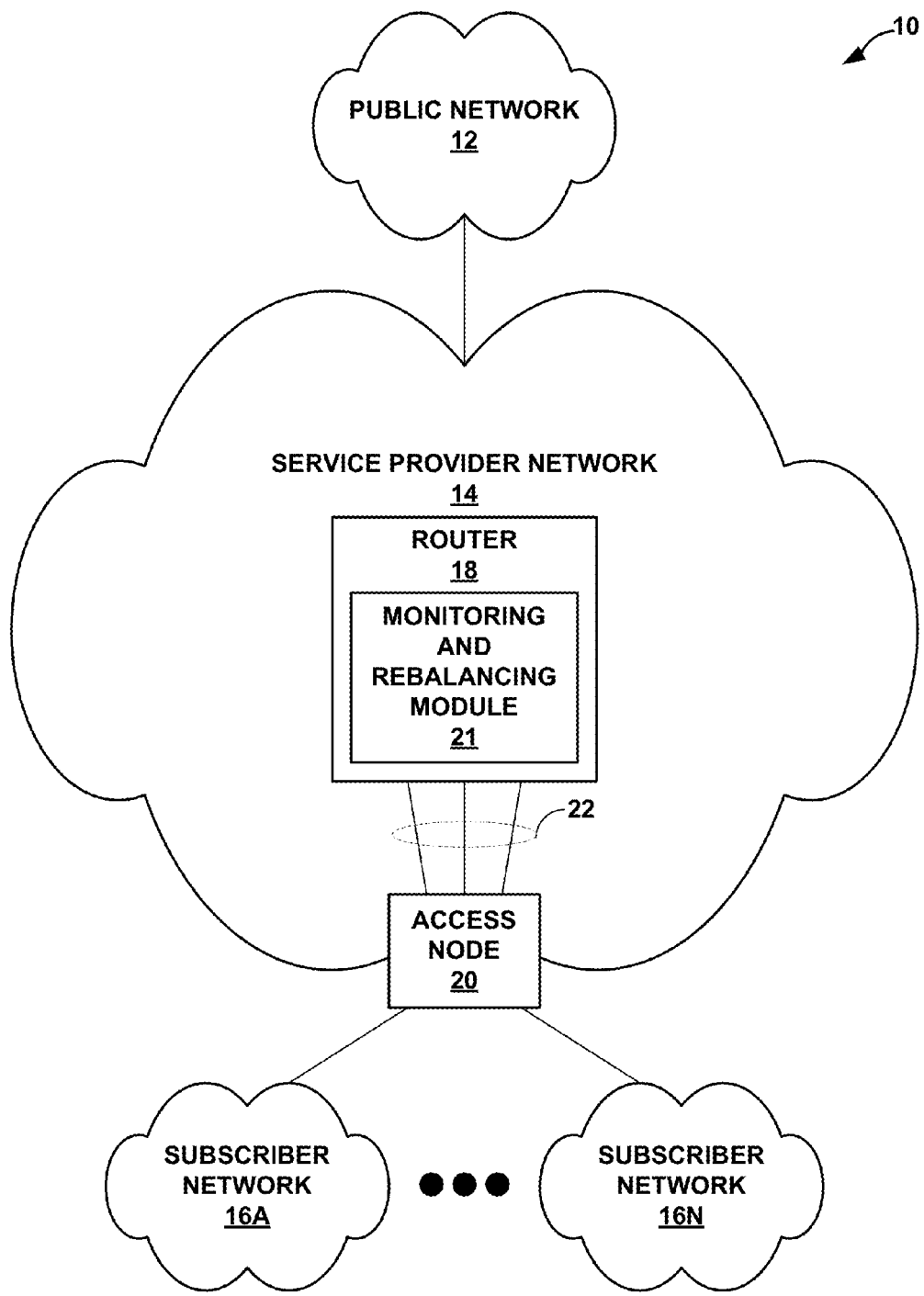
FIG. 1 is a block diagram illustrating a network system that implements the aggregated bundle scheduling techniques described in this disclosure.

FIG. 1 is a block diagram illustrating an example network system 10 that implements the aggregated bundle scheduling techniques described in this disclosure. In the example of FIG. 1, network system 10 includes a public network 12, a service provider network 14 and a plurality of subscriber networks 16A-16N ("subscriber networks 16"). While shown as including public network 12, service provider network 14 and subscriber networks 16, network system 10 is merely one example of the type of network system in which the techniques of this disclosure may be implemented. While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

Public network 12 represents a network that is generally publically accessible by any network-capable device having a network connection. Public network 12 may represent a network that is commonly referred to as the Internet, which refers to a public layer three (L3) packet-switched network (where reference to a layer followed by a number in this disclosure refers to the corresponding layer in the Open Systems Interconnection (OSI) model). Although not shown in the example of FIG. 1, public network 12 generally includes a collection of interconnected network devices, such as data servers, application servers, print servers, laptop computers, desktop computers, workstations, cellular phones (including so-called "smart phones"), routers, switches, and hubs, to name a few by way of example. Typically, while publically available, public network 12 is only accessible by network-capable devices that have an active network connection, where such network connections are commonly provided by service provider networks, such as service provider network 14 in the form of what is typically referred to as a "data service."

Service provider network 14 represents one or more networks owned and operated by a service provider (which is commonly a private entity) that offer one or more services for consumption by subscriber networks, such as subscriber networks 16. Service provider network 14 is typically a L3 packet-switched network that provides L3 connectivity between public network 12 and subscriber network 16. Often, this L3 connectivity provided by service provider network 14 is marketed as a data service or Internet service, and subscribers may subscribe to this data service. Recently, services provided by way of different types of networks from the service provider's L3 packet-switched network, such as telephone service or television service, are being provided by via the service provider's L3 packet-switched network in the form of VoIP, video on domain (VoD) and IPTV, respectively. As a result, service provider network 14 may provide what is referred to as a "triple-play package" of services that include each of data, voice and television services over the L3 packet-switched network. Thus, service provider network 14 may represent a L3 packet-switched network that provides data, voice, television and any other type of service for purchase by subscribers and subsequent consumption by subscriber networks 16.

Subscriber networks 16 each represent a network owned and operated by a subscriber of one or more of these services provided by service provider network 14. Although not shown in the example of FIG. 1 for ease of illustration purposes, subscriber networks 16 may each include one or more network-capable devices, such as network-capable printers, servers, laptop computers, desktop computers, cellular phones (including smart phones), tablet or slate computers, netbooks, personal media players, game consoles, network-capable high definition disk players (such as a Blu-ray disc player), digital video disc players, Internet-ready televisions, and electronic reading devices.

The subscribers that own and operate subscriber networks 16 may subscribe to one or more services from the service provider that owns and operates service provider network 14, where such subscriber agreements generally indicate a level of service, quality of service or class of service with which the service provider generally agrees to provide each of the one or more services. For example, one of the subscribers that owns and operates a corresponding one of subscriber networks 16 may subscriber to a data service of a particular bandwidth, such as 10 megabits per second (Mbps) usually at a class of service lower than that to which the service provider agrees to provide less latency tolerant services, such as IPTV or VoIP. In some instances, the service provider may agree to provide all services to which the subscriber subscribes at a given class of service. Whether on an individual service basis or a subscriber basis, the service provider generally agrees to provide services to which any given one of its subscribers according to an agreed upon class of service.

In order to provide these services in accordance with the agreed upon one or more classes of service, network devices of service provider network 14 that forward traffic corresponding to these services implement scheduling algorithms to schedule this subscriber traffic for delivery downstream (meaning, from public network 12 to subscriber networks 16) to subscriber networks 16 in a manner that delivers this traffic to meet the one or more classes of services associated with this subscriber. These scheduling algorithms may include a weighted fair queuing (WFQ) algorithm, however, WFQ algorithms are generally difficult to implement in that it requires substantial computations to correctly implement WFQ. Thus, the scheduling algorithms may include approximate WFQ algorithms, such as a Weighted Round-Robin (WRR) scheduling algorithm and a Deficit Round-Robin (DRR) scheduling algorithm. Alternatively, the scheduling algorithm may include the scheduling algorithm set forth in U.S. Pat. No. 7,606,154, entitled "Fair Bandwidth Allocation Based on Configurable Service Classes," filed Apr. 1, 2004, which is hereby incorporated by reference as if set forth in its entirety herein. These scheduling algorithms seek to schedule traffic in a manner that fairly allocates bandwidth to each data flow such that class of service agreements may be met while also meeting any latency requirements, which may also form a part of the class of service.

As further shown in the example of FIG. 1, service provider network 14 includes an exemplary network device shown as "router 18" and another network device shown as "access device 20." Router 18 represents any network device that routes or otherwise forwards traffic upstream from and downstream to subscriber networks 16. Typically, router 18 represents a L3 packet-switching device that operates at L3 to receive routing information describing a current topology of service provider network 14. Router 18 then processes this routing information, selecting paths through its representation of the topology of service provider network 14 to reach all available destinations to generate forwarding information. In other words, router 18 reduces these paths to so-called "next hops" which identify which of its interfaces traffic destined for a particular destination is to be forwarded, where the forwarding information includes this list of next hops. Router 18 then installs this forwarding information in a forwarding plane of router 18, whereupon the forwarding plane forwards received traffic in accordance with the forwarding information.

Access device 20 represents a network device that facilitates access by subscriber networks 16 to service provider network 14. Examples of access device 20 include a digital subscriber line access multiplexer (DSLAM), a cable modem termination system (CMTS) or a gateway within a mobile network, such as a mobile access gateway or mobile packet gateway. Typically, access device 20 aggregates upstream traffic from subscriber networks 16 destined for public network 12 and de-aggregates (or de-multiplexes) aggregated downstream traffic from public network 12 destined to individual ones of subscriber networks 16. In some instances, access device 20 may duplicate some types of downstream traffic (e.g., broadcast and multicast traffic) and deliver this duplicated traffic to subscriber devices 16.

Often, service providers employ what is referred to as "aggregated bundles" to interconnect routers and access nodes via two or more links. Example aggregated bundles include aggregated Ethernet bundles, which may be configured and maintained using a link aggregation control protocol (LACP), as defined in IEEE 802.3ad, and entitled "Aggregation of Multiple Link Segments," the contents of which are incorporated herein by reference. Logically, these aggregated bundles (which may also be referred to as "link aggregation groups" or "LAGs") appear as a single connection to the router and/or the access node.

Aggregated bundles provide a number of benefits. First, aggregated bundles may provide redundancy of connection between the routers and access nodes. To illustrate, should one of the link of the aggregated bundle fail, the router and access node interconnected by the aggregated bundle may redirect traffic previously being sent over the failed links of the aggregated bundle to one of the active links of the aggregated bundle, thereby providing redundancy of connection between a router and an access node. Second, use of aggregated bundles may provide increased network capacity (which is often measured in terms of bandwidth) considering that the multiple links of the aggregated bundle may be employed to deliver traffic rather than a single link. Third, aggregated bundles may promote bandwidth scalability in that a service provider may establish an aggregated bundle with two links, as one example, and then incrementally increase the number of links in the aggregated bundle in response to increased subscriber bandwidth demand. In this manner, the service provider may slow capital outlays by only providing sufficient bandwidth to meet current subscriber bandwidth demand rather than expected future subscriber bandwidth demand. Further exemplary details of multi-chassis link aggregation are illustrated in U.S. patent application Ser. No. 13/162,157, entitled "ACTIVE-ACTIVE MULTI-HOMING WITH MULTI-CHASSIS PSEUDOWIRE LINK AGGREGATION," hereby incorporated by reference.

While aggregated bundles may provide for improved redundancy, bandwidth and scalability, the routers and/or access node may experience difficulties in scheduling traffic. For example, typically, when scheduling traffic for delivery over LAGs, the router distributes the packet flows across the links of the LAG. In this sense, the router implements a flow-based LAG, where only flow contents (e.g., packet headers) are used to determine the link of the LAG over which packets associated with that packet flow are to be delivered. However, if not all packet flows utilize or require the same amount of bandwidth, the router may inadvertently assign bandwidth heavy flows to a single link, leaving the remaining links of the flow underutilized. In this way, packet flow-based LAGs rely an assumption that the scheduling mechanism (which is commonly a hash on the packet header) will evenly distribute packet flows across the links of the LAGs and that this in turn will result in even or balanced bandwidth utilization across the links of the LAG. However, if all of the flows are not equal in consuming bandwidth, the semi-random distribution of packet flows to links using a hash function may result in some packet flows being assigned to an over-subscribed (in terms of bandwidth utilization) link while other links are inefficiently utilized in terms of bandwidth utilization due to under-subscription.

In accordance with the techniques described in this disclosure, router 18 may schedule traffic for delivery over aggregated bundle 22 (which may also be referred to as "LAG 22") in a balanced manner. That is, the techniques described in this disclosure may enable network devices, such as router 18, to semi-randomly associate or distribute packet flows to different links (e.g., using a hash function) of aggregated bundle 22 and then monitor delivery of packets of the packet flows to determine an amount of data sent per link of aggregated bundle 22. This amount of data may be specified as actual byte counts sent over each of the links of aggregated bundle 22. The techniques may then enable router 18 to use these byte counts to determine when bandwidth utilization of the links becomes unbalanced and, when determined to be unbalanced, accurately re-assign or re-associate various flows that consume large amounts of bandwidth to underutilized links of aggregated bundle 22. In this way, rather than merely assign packet flows to links of the aggregated bundle and depend on the semi-random assignment of packet flows to result in generally balanced bandwidth utilization, the techniques described in this disclosure may provide for a feedback monitoring loop that facilitates a re-balancing operation based on actual byte-counts.

In operation, router 18 may associate packet flows of packets to different links of aggregated bundle 22. This association may be implicit, meaning that router 18 may utilize an algorithm, function or other mathematical procedure to derive this association based on information specified in each packet, such as a packet header (which typically includes a so-called five-tuple comprising a source address, a source port, a destination address, a destination port, and a protocol that identifies a packet flow to which the packet corresponds). Commonly, router 18 applies a hash function to the five-tuple specified in the packet header of each packet to effectively (and implicitly) associate each packet flow with one of the links of aggregate bundle 22. However, the association may, in some examples, be explicitly maintained using a data structure (such as a table, tree, linked list, etc.).

Regardless, router 18 may then transmit the packets of the packet flows via the associated different links of aggregated bundle 22. When transmitting these packets, router 18 may invoke monitoring and rebalancing module 21, which may represent a module that monitors the transmission of the packets via each of the corresponding assigned link of aggregated bundle 22 to determine an amount of data sent per link of aggregated bundle 22. In some instances, monitoring and rebalancing module 21 may access a byte-count per hash bucket table, when the association between packet flows and links of aggregated bundle 22 is maintained implicitly using a hash function. Router 18 may, in these instances, map each hash bucket to one of the links of aggregated bundle 22, as described in more detail below, where the byte counts associated with each hash bucket may effectively define a portion of the amount of data sent per link. Router 18 may determine the total amount of data sent per link by adding together the byte-counts associated with those hash buckets that are each mapped to the same link.

In any event, monitoring and rebalancing module 21 may also represent a module to detect when bandwidth utilization is unbalanced between the aggregated bundle 22 based on the determined amount of data sent per link of the aggregated bundle 22. That is, router 18 may invoke monitoring and rebalancing module 21 to assess byte counts representative of the amount of data sent via a first link of aggregated bundle 22 and an amount of data sent via a second link of aggregated bundle 22. Monitoring and rebalancing module 21 may compute balance percentages as a function of the amount of data sent via the first link of aggregated bundle 22 and the amount of data sent via a second link of aggregated bundle 22, comparing this balance percentage to a balance threshold (which may for example be set to 20%). Monitoring and rebalancing module 21 then determines that the first link has become unbalanced or otherwise failing to conform to a desired utilization in terms of bandwidth utilization when this balance percentage exceeds the balance threshold.

Monitoring and rebalancing module 21 may also represent a module to re-associate at least one of the packet flows with a different link of aggregated bundle 22 based on a determination that the bandwidth utilization is unbalanced or otherwise failing to conform to a desired utilization profile for the individual links of the aggregated bundle 22. In some instances, as noted above, each hash bucket may be associated with a different link of aggregated bundle 22. Although the hash value generated by applying the hash function to the five-tuple may implicitly identify the link in the manner noted above, in some instances, the hash value is used to identify an entry in what may be referred to as a "link association table" that explicitly identifies one of the links of aggregated bundle 22 (often by way of specifying a link index that identifies the one of the links of aggregated bundle 22). Generally, the explicit identification of links of aggregated bundle 22 is utilized in addition to the hash function to promote configurability of hash buckets such that these buckets can be re-associated with different links of aggregated bundle 22 rather than having to adapt the hash function. In this way, the hash buckets may effectively comprise the entries in the table, where the above-noted byte-counts may be maintained in a separate table (referred to as a "byte-count table") having the same number of entries of the link association table, where each entry of this byte-count table specifies a corresponding portion of the amount of data for the link to which the corresponding entry in the link association table identifies.

In any event, based on the byte counts noted above, monitoring and rebalancing module 21 may update the entries of the link association table that, according to their corresponding byte-count, represent bandwidth heave flows (or flows that consume large amounts of bandwidth). Monitoring and rebalancing module 21 may re-associate these flows that consume large amounts of bandwidth with a different link of aggregated bundle 22 so as to balance bandwidth utilization across all of the links of aggregated bundle 22. In some instances, monitoring and rebalancing module 21 re-associates these flows by changing their corresponding entry in the link association table to identify the one of links of aggregated bundle 22 that is least utilized in comparison to the other links of aggregated bundle 22. Monitoring and rebalancing module 21 may continually monitor transmission of packets via links of aggregated bundle 22 and periodically re-balance when required (on, for example, a configurable basis).

In this manner, the techniques may provide for a feedback mechanism that operates on actual amounts of data to perform accurate rebalancing of flows across links of aggregated bundle 22 so as to improve link utilization. The techniques described in this disclosure may also result in more consistent packet delivery in comparison to conventional scheduling algorithms that rely on hash functions alone, as over-subscribed links commonly result in dropped packets. In addition, the techniques may enable service providers to provide better service to customers, considering the potential improvements in packet delivery, while also possibly providing cost savings, considering that bandwidth may be utilized more efficiently. As a result, the techniques may effectively promote cost savings while improving the quality of experience of services provided to subscribers.

In other words, the techniques may enable a network device that previously applied hash functions to assign packets flows to particular links to perform a rebalancing operation based on counts, such as packet counts or byte counts. The techniques may in this way enable device that perform hash-based flow assignment to update a transform (such as a link association table described in more detail below) to modify how flows are assigned to links of an aggregated bundle of links so as to redistribute load and facilitate load balancing across the links of the aggregated bundle. Thus, network device that previously only performed hashed based flow assignment and relied on this hash mechanism to distribute load (under the theoretical assumption that all flows are equal and that the hash function actually distributes flows in a random, even manner) may be adapted in accordance with the techniques to actually provide for a more adaptive count-based load balancing mechanism.

While the term "subscriber" as used in this disclosure generally refers to a subscriber of services consumed by a service provider, the techniques should not be limited in this respect and may be implemented in any context in which scheduling is performed to deliver traffic in accordance with one or more classes of service. In these more general contexts, the service may refer to packets or traffic delivered in accordance with a class of service. In addition, the service provider may refer to private or public service providers that generally delivery or otherwise provide these services to the consuming devices. Moreover, the term "subscriber" may refer to individual subscriber devices, where the techniques may be implemented with respect to each subscriber device rather than per subscriber.

Figure 2:
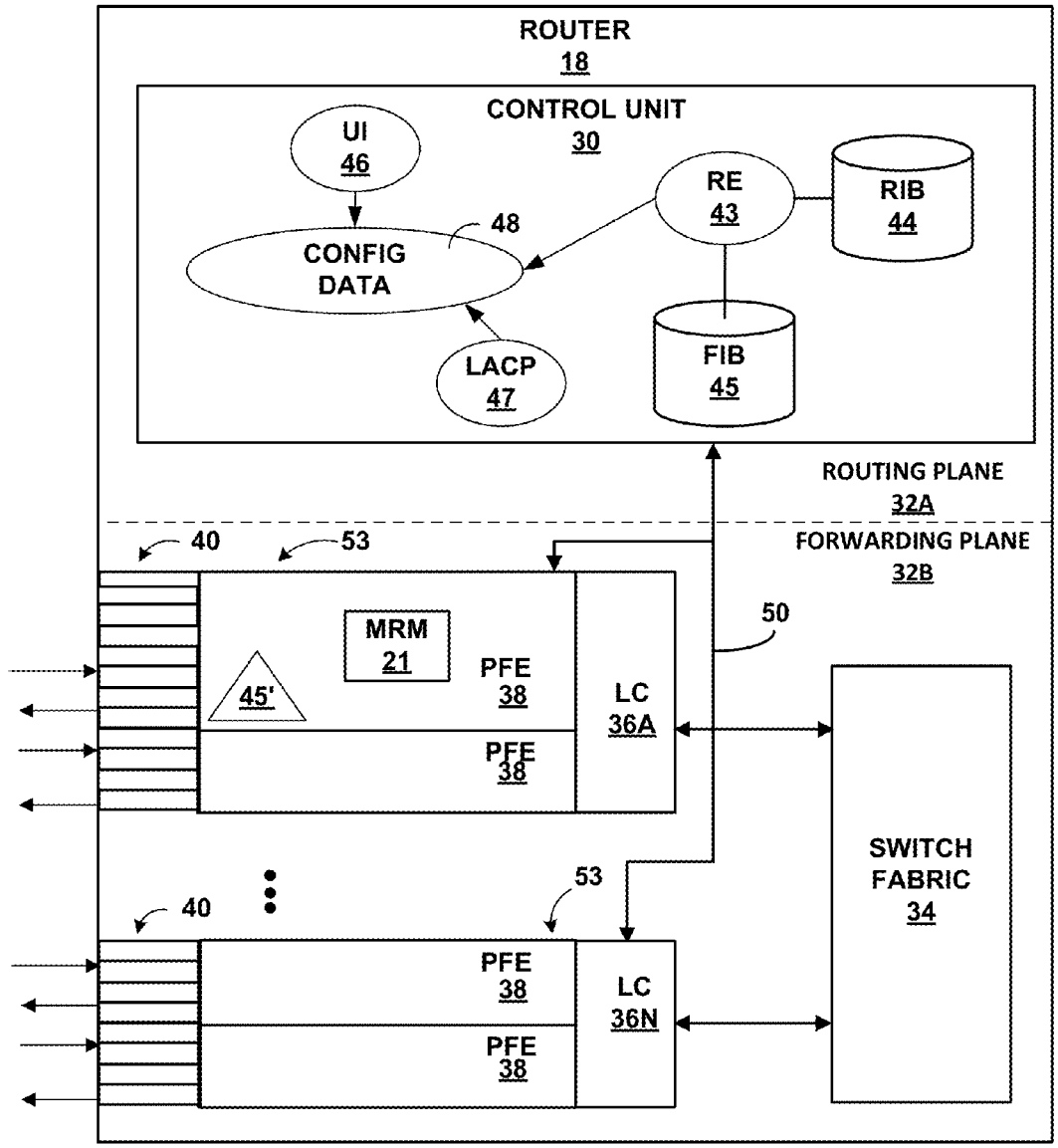
FIG. 2 is a block diagram illustrating a network device of the network system shown in the example of FIG. 1 in more detail.

FIG. 2 is a block diagram illustrating an example embodiment of router 18 of FIG. 1 in more detail. In this example, router 18 includes a control unit 30 that provides control or routing plane functionality for router 18. In the example of FIG. 2, this routing plane is shown as routing plane 32A. Router 18 also includes switch fabric 34 interconnecting a set of line cards ("LCs") 36A-36N, each of which includes a one or more of packet-forwarding engines ("PFEs") 38 that send and receive traffic by a set of interface cards (IFCs) 40 ("IFCs 40") that typically have one or more physical network interfaces (ports). LCs 36, components thereof, and switch fabric 34 collectively provide a data or forwarding plane for forwarding network traffic, such as the downstream and upstream subscriber traffic. This forwarding plane is shown as forwarding plane 32B in the example of FIG. 2. Forwarding plane 32B may alternatively be referred to as "data plane 32B." Although not shown in FIG. 2, PFEs 38 may each comprise a central processing unit (CPU), memory and one or more programmable packet-forwarding application-specific integrated circuits (ASICs). Switch fabric 34 provides a high-speed interconnect for forwarding incoming data packets between PFEs 38 for transmission over a network, such as service provider network 14 shown in the example of FIG. 1.

Control unit 30 provides an operating environment for various protocols that perform routing plane functions for router 18. For example, control unit 30 may provide an operating environment for execution of a routing engine (RE) 43 ("RE 43") that implements a routing protocol to control L3 routing functions. In general, routing engine 43 receives and sends routing protocol messages to maintain a routing information based (RIB) 44 ("RIB 44") that stores L3 routing information representative of a topology of service provider network 14. Based on RIB 44, RE 43 generates a forwarding information base (FIB) 45 ("FIB 45") that stores forwarding data structures for installation within (e.g., programming of) PFEs 38.

In the example of FIG. 2, control unit 30 includes a user interface ("UI") module 46 ("UI 46") with which an administrator interacts, either directly or by way of a provisioning system or software agent, to configure aggregated bundles, such as aggregated bundle 22 shown in the example of FIG. 1. UI 46 may receive commands in accordance with a command syntax and store these commands as configuration data 48 ("config data 48"). UI 46 may also receive commands to configure, for each of the logical interfaces, a primary scheduling module and one or more backup scheduling modules, also storing these commands as configuration data 48. Additional information regarding primary scheduling modules and backup scheduling modules and their exemplary operation with respect to aggregated bundles of two or more links can be found in U.S. patent application Ser. No. 13/340,182, entitled "SCHEDULING TRAFFIC OVER AGGREGATED BUNDLE OF LINKS," filed Dec. 29, 2011, the entire contents of which are hereby incorporated by reference.

In addition, control unit 30 includes a link aggregation control protocol (LACP) module 47 that operates to bundle one or more of interfaces 51 into aggregated bundle 22 and treat bundle 22 as a single logical interface in terms of L2 forwarding. While shown as implementing LACP, control unit 30 may implement or otherwise provide an execution environment for any other type of aggregated bundle protocol capable of establishing aggregated bundles of logical and/or physical interfaces. LACP module 47 generally provides the abstraction to maintain aggregated bundle 22.

In the example of FIG. 2, control unit 30 is connected to each of LCs 36 by a dedicated internal communication link 50. For example, dedicated link 50 may comprise a 200 Mbps or Gigabit Ethernet connection for internal communication between the multiple components of router 18. In one embodiment, control unit 42 communicates data representative of a software copy 45' of FIB 45 into PFEs 38 to program PFEs 38 and thereby control forwarding of traffic by the corresponding components within forwarding plane 32B. This allows the software FIB stored in memory (e.g., on-chip RAM) of in each of PFEs 38 to be updated without degrading packet-forwarding performance of router 18. In some instances, control unit 30 may derive separate and different software FIBs for each respective one of PFEs 38. In addition, one or more of PFEs 38 may include packet-forwarding ASICs (not shown in the example of FIG. 2) that PFEs 38 program with a hardware-copy of FIB based on the software FIBs (i.e., hardware versions of the software FIBs) copied to each respective PFE 38. In other, more complex embodiments, router 18 may have many more LCs 50 (e.g., 48 or 64 FPCs), each of which may have up to four PFEs 38 that each couple to up to sixteen interface cards 51.

As noted above, an administrator or other user may interface with control unit 30 via a user interface presented by UI 46. The user may input commands instantiating or otherwise defining aggregated bundle 22. Often, the user interfaces with UI 46 remotely via a provisioning system. Commonly, this user is a point-of-sales representative of the service provider that receives service requests from the subscriber. This representative may input the service request via their computer, which in turn interfaces with a provisioning system that interfaces with the router through which the subscriber may gain access to service provider network 14. This provisioning system may interface with UI 46 by executing a pre-configured script associated with the service request. This pre-configured script may include commands that configure aggregated bundle 22.

To illustrate, commands that may be used to configure aggregated bundle 22, consider the following exemplary command line interface (CLI):
cli@router# set interfaces ae0 aggregated-ether-options load-balance?
Possible completions:
>adaptive
In the example above, the command prompt "cli@router#" has been used to enter the "aggregated-ether-options," which refers to the options for aggregated bundle 22. The options include load-balancing options, such as adaptive, per-packet and rebalance-periodic.

The adaptive option, when selected, may provide for further settings, such as the tolerance (or, what may be referred to as the "balance threshold" in this disclosure), the packet per second (PPS), bytes per second (BPS) and scan interval. An example of this CLI is as follows.

cli@router# set interfaces ae0 aggregated-ether options load balance adaptive?
Possible completions:

| | |
|---|---|
| enable tolerance | Tolerance in percentage (1,100, default 20 percent) |
| scan-interval | Scan interval in seconds (10 . . . 600, default 30 sec) |
| criterion | pps or bps (default bps) |

The user may, in this manner, configure an adaptive load balancing across the links of aggregated bundle 22 using a configurable threshold and scan-interval (which may refer to the periodicity of invoking MRM 21 to perform this rebalancing operation). Moreover, the user may configure MRM 21 to evaluate bandwidth utilization based on a PPS or BPS basis. Further, in some embodiments, the user may provide input defining a profile specifying a desired utilization for each link in environments where a distribution other than an equal distribution is desired. The user may, for example, enter a percentage or weighting for each link.

In any event, once configured, control unit 30 installs forwarding information for aggregated bundle 22 within forwarding plane 32B according to the configuration data 48. That is, control unit 30 may interface with one or more LCs 36 or PFEs 38 of one or more LCs 36 to configure hardware or software executing on hardware within these LCs 36 and/or PFEs 38 to provide aggregated bundle 22. As part of installing or otherwise configuring data plane 32B to provide aggregated bundle 22, RE 43 specifies the links to be used for the aggregated bundle in RIB 44, where RE 43 then reduces this routing information that includes this routing information to forwarding information, and stores this forwarding information to FIB 45. Control unit 30 then installs this forwarding information into PFEs 38 as FIB 45'. In the example of FIG., only top PFE 38 of LC 36A is shown in detail. However, each of PFEs 38 may be similar to, if not substantially the same as, top-most PFE 38 of LC 36A. The remaining ones of PFE 38 are not shown in detail for ease of illustration purposes.

In any event, after this forwarding information is installed in forwarding plane 32B, router 18 may begin to receive and forward traffic downstream to the corresponding one of subscriber networks 16. That is, PFEs 38 may receive downstream traffic destined for the one of subscriber networks 16, access FIBs 45' using a five-tuple extracted from this traffic to determine to which of PFEs 38 to forward this traffic and forward this traffic to the determined one of PFEs 38. To determine to which of PFEs 38 to forward this traffic for delivery to the associated one of subscriber networks 16, receiving PFEs 38 may apply a hash function (which is not shown in the example of FIG. 2 for ease of illustration purposes) to the five-tuple in order to generate a hash value. Receiving PFEs 38 may use this hash value as an index into a link association table (which may effectively represent a transform that transforms the hash value into a link identifier). Receiving PFEs 38 may then access the link association table using the index to effectively identify a link to which the packet flow and thereby the packet has been associated.

When configuring forwarding information 45' installed in PFEs 38 to support aggregated bundle 38, LCs 36 may generate forwarding information 45' to include this link association table, where the link association table is pre-populated in a defined manner to associate packet flows in a balanced or even manner across all of the links of aggregated bundle 22. For example, consider that aggregated bundle 22 includes three links, identified as link 0, link 1 and link 2. Moreover, assume that link association table has 256 entries. LC 36A may set the first entry of the link association table to specify link 0, the second entry of the link association table to specify link 1, the third entry of the link association table to specify link 2, the fourth entry of the link association table to specify link 0, etc. LCs 36 may also program PFEs 38 with the hash function based on the routing information or in response to routing information specifying aggregated bundle 22. These tables, hash functions are not shown in the example of FIG. 2 for ease of illustration purposes but are illustrated in more detail with respect to FIG. 3.

In operation, PFE 38A may, for example, receive a packet, parse the five-tuple from the packet, apply the hash function to generate a hash value and use the hash value as in index to perform a lookup in the link association table so as to retrieve an entry of the link association table. This entry may specify one of the links, or more likely, one of PFEs 38 to which the corresponding packet is to be forwarded. That is, while described in this disclosure as specifying a link for purposes of discussion, commonly, PFEs 38 operate to determine what is described above as being a next hop. This next hop may specify one of PFEs 38 to which a given packet is to be forwarded. Considering that this next hop effectively identifies the corresponding link of aggregated bundle 22 in that the next hop may define the context for forwarding the packet that is restricted to a single (physical or virtual) link, the next hop may effectively specify the link of aggregated bundle 22 to which the packet flow and, thereby the packet, is associated. In this respect, reference to associating a link with a packet flow may also refer to associating a packet flow with a PFE 38 that forwards packets via the associated link.

In any event, PFEs 38 may also each include a byte-count table, which maintains a byte-count per each of the hash buckets. PFEs 38 may execute the monitoring and rebalancing module (MRM) 21 described above with respect to the example of FIG. 1. Forwarding logic of PFEs 38, such as forwarding ASICS, may update the byte-counts when associating packets with specific hash buckets, where each entry of the byte-count table corresponds to one of the hash buckets (which maps to one of the links of aggregated bundle 22). That is, one of PFEs 38 may associate, for example, a 100 byte packet with a hash bucket mapped to link 0 using the hash function. This one of PFEs 38 may then update the entry in the byte-count table that corresponds to the hash bucket (often using the same index used to access the entry in the link-association table) and increment the byte-count stored to this entry by 100 bytes (or, in other words, the size of the packet).

MRM 21 may traverse this byte-count table periodically and add together all byte-counts stored to entries that correspond to entries of link association table identifying link 0 to determine an amount of data sent (which may be referred to as an accumulated byte-count) since the last time MRM 21 traversed the byte-count table to determine this amount for link 0 of aggregated bundle 22. MRM 21 may likewise traverse the byte-count table for each of the other links of aggregated bundle 22, i.e., link 1 and link 2 in the example introduced above. In this way, MRM 21 may determine an amount of data sent via each of the links of aggregated bundle 22 since the last time MRM 21 traversed the byte-count table.

After determining these amounts for each link of aggregated bundle 22, MRM 21 may then determine whether bandwidth is being utilized in a balanced manner across each of the links of aggregated bundle 22. In some instances, MRM 21 may compare the amounts for two of the links of aggregated bundle 22 to determine a percentage bandwidth utilization difference. MRM 21 may then compare this percentage bandwidth utilization difference to a bandwidth threshold, which may specify a percentage of bandwidth difference that may be considered as acceptable (such as, by an operator or network administrator). In some instances, an operator or network administrator may interface with control unit 30 via UI 46 to configure this threshold to specify an "acceptable" bandwidth utilization difference percentage of, for example, 20%. MRM 21 may then determine that bandwidth utilization differences that accede this threshold specifying an "acceptable" bandwidth utilization difference of 20% as being "unacceptable." MRM 21, in response to this determination, reassigns one or more hash buckets from the one of links of aggregated bundle 22 having the greater bandwidth utilization (or, in terms of the amounts of data, a greater amount of data) among the bandwidth utilizations of the two links from which the bandwidth utilization difference percentage was calculated to the other one of the links from which the bandwidth utilization difference percentage was calculated.

To reassign hash buckets (and, as a result, their corresponding flows to the less utilized link), MRM 21 may select those entries of the link association table that identify the over-subscribed link and which have corresponding entries in the byte-count table having the largest byte counts (or, in some instances, bytes counts approximately equal to half the difference between the cumulative byte counts computed for the two links for which the bandwidth utilization difference percentage was calculated). MRM 21 may repeat this process for each combination of two links among the links of aggregated bundle 22. To illustrate, consider the example noted above where aggregated bundle 22 includes three links, link 0, link 1 and link 2. MRM 21 may compute a bandwidth utilization difference percentage for link 0/link 1, link 0/link 2 and link 1/link2. MRM 21 may then, for each computed difference percentage, determine whether the two links are unbalanced by comparing the corresponding difference percentage to the threshold. MRM 21 may then, based on this comparison, reassign flows currently assigned to the over-utilized one of the two links (in terms of bandwidth) to the less utilized one of the two links in the manner described above.

In this manner, MRM 21 may identifying one or more entries of the link association table that correspond to one or more entries in the determined byte-count table such that if re-associated with the different link of the aggregated bundle of two or more links would result in more balanced bandwidth utilization across the links of the aggregated bundle of two or more links. MRM 21 may then update the identified one or more entries of the link association table to re-associate the at least one of the packet flows with the different link of the aggregated bundle of the two or more links based on the determination that the bandwidth utilization is unbalanced.

MRM 21 may periodically perform the operations described above to ensure that, over time, bandwidth utilization remains balanced among the link of aggregated bundle 22. Again, the operator or network administrator may interface with control unit 30 via UI 46 to specify the periodicity of the rebalancing operation. The operator or network administrator may set this periodicity of this rebalancing operation to occur, for example, every 10 seconds, 20 seconds, 30 seconds or any other amount of time. In this way, the techniques may enable router 18 to schedule traffic for delivery via aggregated bundle 22 in a manner that ensures balanced bandwidth utilization across the links of aggregated bundle 22 within an acceptable tolerance level, i.e., 20% in the example above.

A user may also interface with UI 46 to determine statistics regarding the rebalancing operations so as to ensure re-balancing has been properly configured and is operational. The following CLI provides one example of how a user may interface with UI 46 to view load balancing statistics of aggregated bundle 22.

```
cli@router> show interfaces ae0 extensive
Physical interface: ae0, Enabled, Physical link is Up
: : : :
   Logical interface ae0.0
: : : :
   Adaptive Statistics
      Adaptive Adjusts:        264
      Adaptive Scans:          172340
      Adaptive Tolerance:      20%
      Adaptive Updates:        20
```

In the example CLI above, the user may view the number of adaptive adjusts (which may refer to the number of flow re-associations), the number of adaptive scans (which may refer to the number of times MRM 21 is invoked), the adaptive tolerance (which may refer to the balance threshold) and the number of adaptive updates.

The operating environment of control unit 30 may be implemented solely in hardware, or may be implemented as a combination of hardware and software or firmware. For example, control unit 30 may include one or more processors which execute software instructions. In that case, control unit 30 may include various software modules or daemons executing on an operating system, and may include a non-transitory computer-readable storage device, such as computer memory or hard disk, for storing executable instructions.

The architecture of router 18 illustrated in FIG. 2 is shown for exemplary purposes only. The disclosure is not limited to this architecture. In other embodiments, router 18 may be configured in a variety of ways. In one embodiment, for example, some of the functionally of control unit 30 may be distributed within PFEs 38. Elements of control unit 30 may be implemented solely in software that executes on hardware, or hardware, or may be implemented as combinations of hardware and software or firmware. For example, control unit 30 may include one or more processors, one or more microprocessors, digital signal processors (DSPs), application specific integrated circuits (ASICs), field programmable gate arrays (FPGAs), network processors, or any other equivalent integrated or discrete logic circuitry, or any combination thereof, which execute software instructions. In that case, the various software modules of control unit 30 may comprise executable instructions stored, embodied, or encoded in a non-transitory computer-readable medium, such as a computer-readable storage medium, containing instructions.

Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other non-transitory computer-readable media. Computer-readable media may be encoded with instructions corresponding to various aspects of router 18, e.g., protocols. Control unit 30, in some examples, retrieves and executes the instructions from memory for these aspects.

Figure 3:
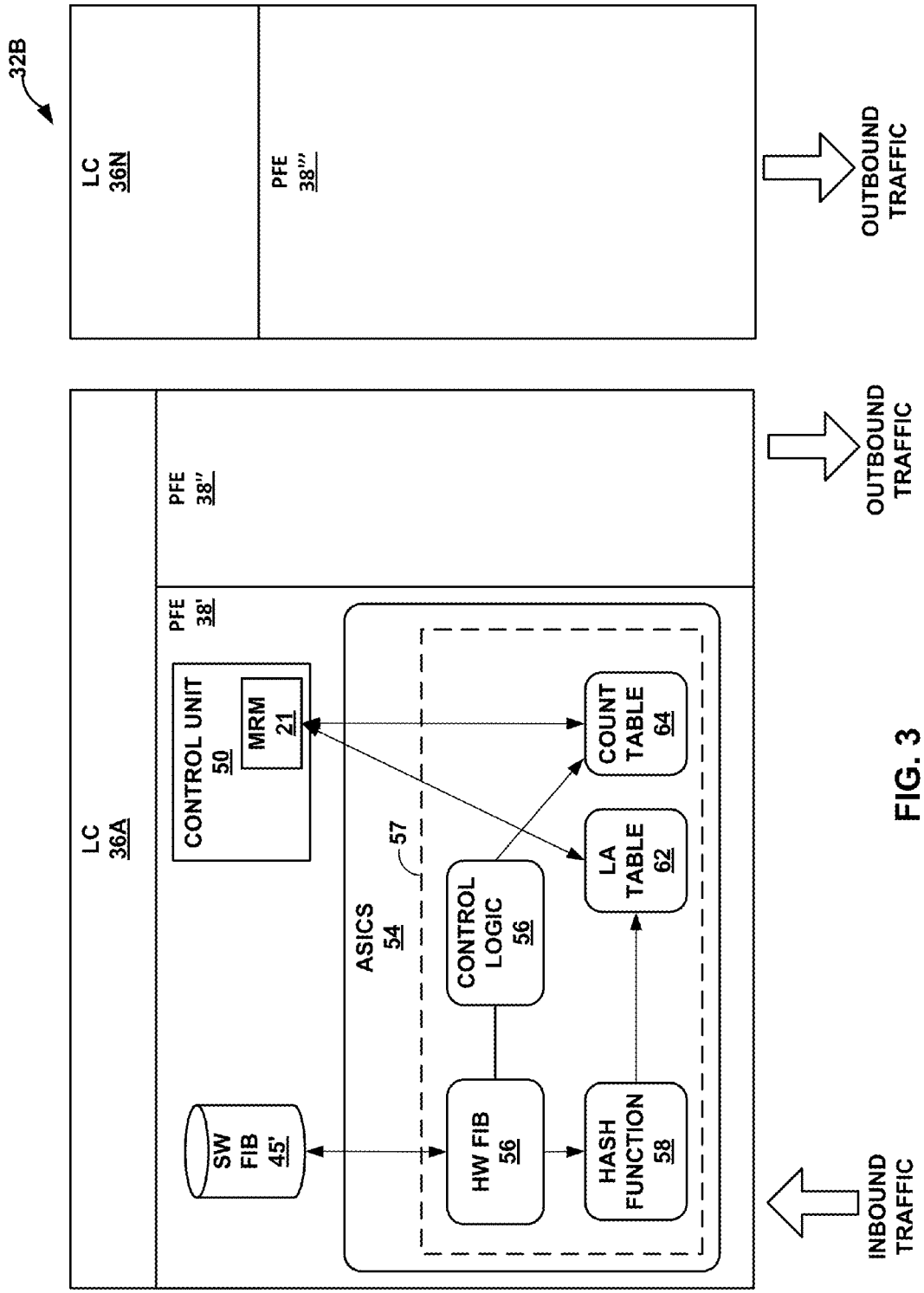
FIG. 3 is a block diagram illustrating various exemplary aspects of forwarding plane of the network device shown in the example of FIG. 2 in implementing the aggregated bundle scheduling techniques described in this disclosure

While the techniques have been described above as being performed automatically (e.g., meaning without requiring direct user or administrative intervention), the techniques may be initiated by a user using FIG. 3 is a block diagram illustrating various exemplary aspects of forwarding plane 32B in implementing the aggregated bundle scheduling techniques described in this disclosure. The example of FIG. 3 shows LC 36A of forwarding plane 32B to include two PFEs, denoted PFE 38' and 38", while LC 36A is shown to include a single PFE, denoted PFE 38'". PFE 38' includes a control unit 50 that may be similar to control unit 30 in terms of implementation. Control unit 50 may interface with control unit 30 to receive and store software FIB 45'. ASICs 54 are microcode-controlled chipsets programmably configured by control unit 50 executing on each of PFEs 38 (including PFEs 38', 38" and 38'"). While described in this disclosure with respect to ASICs 54, the techniques may be implemented by other forms of hardware, such as one or more network processors, or any combination of hardware and software.

Specifically, one or more of ASICs 54 is controllable by microcode 57 programmed by control unit 50. Control unit 50 programs a hardware (HW) FIB 56 ("HW FIB 56") into internal memory of ASICs 54 based on software FIB 45'. When forwarding packets, control logic 56 locates HW FIB 56 and, upon reaching a FIB entry for the packet (e.g., a leaf node), microcode-implemented control logic 56 automatically selects a forwarding next hop (FNH). In this instance, the FNH for aggregated bundle 22 specifies or references hash function 60. Hash function 60 represents a function that maps the above noted five-tuple specified in a header of a packet to a hash value. Typically, hash function 60 semi-randomly distributes input values, which are often called "keys," of a large data set into a smaller data set. The hash value represents a value of the smaller data set, which often identifies what may be referred to as a hash bucket.

ASIC 54 include LA table 64 to define associations between hash values and links of aggregated bundle 22, where as described above, the hash value may represent an index into LA table 64. To illustrate, consider the following example of LA table 64 shown in Table 1.

TABLE 1

| Index | Link |
|---|---|
| 0 | 0 |
| 1 | 1 |
| 2 | 2 |
| 3 | 0 |
| 4 | 1 |
| 5 | 2 |
| 6 | 0 |
| ... | ... |
| 255 | 0 |

Table 1 illustrates an example of LA table 64 as originally configured, prior to rebalancing in accordance with the techniques described in this disclosure, but after initialization of LA table 64 where each entry specifies one of three links of aggregated bundle 22. The one of the links of the aggregated bundle 22 is specified as a function of the corresponding index for each entry modulo by three (i.e., the total number of links in aggregated bundle 22 in this example).

ASICS 54 also include byte count (BC) table 66 ("Count table 66"), which stores cumulative byte counts of packets or flows associated with each corresponding entry of LA table 64. The following Table 2 provides an example of Count table 66 as initially configured.

TABLE 2

| Index | Byte Count |
|---|---|
| 0 | 0 |
| 1 | 0 |
| 2 | 0 |
| 3 | 0 |
| 4 | 0 |
| 5 | 0 |
| 6 | 0 |
| ... | ... |
| 255 | 0 |

As shown in Table 2, the byte counts for each hash bucket identified by the corresponding index has been initially configured to be zero. In other words, prior to transmitting packets via the links of aggregated bundle 22, ASICs 54 initially configure the cumulative byte counts as zero to indicate that zero bytes have been sent via the corresponding link.

Although not shown in the example of FIG. 3 for ease of illustration purposes, PFEs 38" and 38''' may be substantially similar to PFE 38' in terms of including a control unit 50, SW FIB 45' and ASICS 54 and may perform similar operations to those described above for forwarding traffic (e.g., packets) internally or within router 18 to other PFEs 38. In other words, different aspects of PFEs 38' and PFEs 38" and 38''' have been shown for ease of illustration purposes. Yet, PFEs 38', 38" and 38''' may include components, modules or units that perform any of the operations described with respect to any one of PFEs 38', 38" and 38'''. The techniques therefore should not be limited to the simplified version of PFEs 38', 38" and 38''' shown in the example of FIG. 3. Generally, PFE 38' represents the internal forwarding aspects of PFEs 38.

In any event, after the ASICs 54 are programmed with HW FIBs 56, PFE 38' may receive inbound traffic destined for the one of subscriber networks 16. PFE 38' references HW FIB 56 using the five-tuple of the packet as a key to obtain a next hop for the packet. Assuming this packet is to be forwarded via aggregated bundle 22, PFE 38' references HW FIB 56 using the five-tuple of the packet to resolve a FNH that references hash function 60. ASICs 54 then apply hash function 60 to the five tuple to generate a hash value, which ASICs 54 utilize as an an index into LA table 64. ASICs 54 perform a lookup in LA table 64 using this index to retrieve a corresponding entry into LA table 64. Assuming that the index equals zero, ASICs 54 retrieve entry zero of LA table 64 and determine that the packet is to be sent via link zero (per the example of Table 1 above) of aggregated bundle 22 (and, more specifically, determine that the packet is to be forward to PFE 38" in this example that includes a port physically connected to link zero of aggregated bundle 22). Prior to forwarding this packet, ASICs 54 determine a size of the packet in terms of a number of bytes (or, in other words, byte count). ASICs 54 update the corresponding entry in count table 66 to increment the cumulative byte count stored to the entry of count table 66 identified by the determined index. ASICS 54 then forward this packet to PFE 38" (after possibly tagging or marking this packet).

Count table 66 may now specify an updated entry zero and may be reflected for example by the following Table 3, where entry zero now stores a byte count of 130 bytes.

TABLE 3

| Index | Byte Count |
|---|---|
| 0 | 130 |
| 1 | 0 |
| 2 | 0 |
| 3 | 0 |
| ... | ... |
| 255 | 0 |

ASICs 54 may continue in this manner to receive and process packets to be delivered via one of the links of aggregated bundle 22 in the manner described above, forwarding these packets via their corresponding ones of the links of aggregated bundle 22 while also maintaining or otherwise updating count table 66. The following Table 4 provides one example of count table 66 prior to performing rebalancing in accordance with the techniques described in this disclosure.

TABLE 4

| Index | Byte Count |
|---|---|
| 0 | 19385 |
| 1 | 5708 |
| 2 | 1668 |
| 3 | 14531 |
| 4 | 113 |
| 5 | 3987 |

TABLE 4-continued

| Index | Byte Count |
|---|---|
| 6 | 7098 |
| ... | ... |
| 255 | 2304 |

Periodically, control unit 50 may invoke monitoring and rebalancing module (MRM) 21 ("MRM 21"), which may perform the rebalancing techniques described in this disclosure. MRM 21 may interface with ASICs 54 to read count table 64. MRM 21 may then determine total cumulative byte counts per line by adding up byte counts stored to count table 64 and associated with link zero (that is, having an index that identifies entries in LA table 62 associated with link zero). Referring to Table 1 above for purposes of illustration, index zero, three and 255 identify entries in LA table 62 that specify link zero. Accordingly, MRM 21 may add byte counts stored to entries zero, three and 255, as well as, any other entry that is a multiple of three (given that the initial configuration would set any entry identified by an index that is a multiple of three to be associated with link zero) together to get a total cumulative byte count for link zero. MRM 21 may determine in this manner a total cumulative byte count, in this example, for links zero, one and two.

After computing the total cumulative byte counts for each link of aggregated bundle 22, MRM 21 may determine a balance percentage as a function of the total cumulative byte count for link zero ($TCBC_{L0}$) and the total cumulative byte count for link one ($TCBC_{L1}$). That is, MRM 21 may divide $TCBC_{L0}$ by $TCBC_{L1}$ to derive a balance percentage for link zero, link one ($BP_{L0, L1}$). MRM 21 may also determine a balance percentage for link zero, link two ($BP_{L0, L2}$) and a balance percentage for link one, line two ($BP_{L1, L2}$). MRM 21 may compare the absolute value of each of $BP_{L0, L1}$, $BP_{L0, L2}$ and $BP_{L1, L2}$ to a balance threshold. This balance threshold may be configured along with the periodicity of performing this rebalancing operation. In any event, upon determining that one or more of $BP_{L0, L1}$, $BP_{L0, L2}$ and $BP_{L1, L2}$ are greater than the balance threshold, MRM 21 then rebalances the flow of data to better balance bandwidth utilization across all three links of aggregated bundle 22.

To illustrate, assume that link zero is being over-utilized in terms of bandwidth in comparison to link one. MRM 21 determines, under this assumption, that the absolute value of $BP_{L0, L1}$ is greater than the balance threshold. MRM 21 then determines whether the $TCBC_{L0}$ is greater than $TCBC_{L1}$. Assuming $TCBC_{L0}$ is greater than $TCBC_{L1}$, MRM 21 may determine that flows currently associated with or assigned to link zero need to be re-associated with or re-assigned to link one. MRM 21 may determine which flows to re-assign by first determining the difference between $TCBC_{L0}$ and $TCBC_{L1}$. MRM 21 may then divide this difference in half to determine an approximation of the amount of data to re-distribute from link zero to link one. Assuming half the difference of TCBCL0 and TCBCL1 is equal to 19,200 bytes, MRM 21 may then scan its representation of count table 64 (which MRM 21 stores locally so that the hardware version of count table 64 stored in ASICs 54 may continually be updated and used for determining byte counts in real-time) and identify entries associated with link zero storing byte counts that approximately equal this 19,200 byte value. MRM 21 may identify the entry of count table 64 as being approximately equal to this 19,200 byte value. To re-associate the flows from link zero to link one, MRM 21 then interfaces with LA table 64 and updates entry zero to reference link one rather than link zero, thereby effectively re-associating flows previously associated with link zero to link one.

Table 5 reflects an updated version of LA table 64 after MRM 21 has edited entry zero to reference link one rather than link zero.

TABLE 5

| Index | Link |
|---|---|
| 0 | 1 |
| 1 | 1 |
| 2 | 2 |
| 3 | 0 |
| 4 | 1 |
| 5 | 2 |
| 6 | 0 |
| ... | ... |
| 255 | 0 |

While described above with computing balance percentages for each link pair, the techniques may, in some instances, be performed so as to only determine a balance percentage for the pair having the minimum and maximum TCBC values. The techniques may then proceed to rebalance flows to move flows from the link associated with the maximum TCBC value to the link associated with the minimum TCBC value. In this way, the techniques may facilitate rebalancing of flows from over-utilized links to under-utilized links.

In any event, PFE 38' may continue to operate in this manner to balance traffic across the links of aggregated bundle 22. That is, PFE 38' may periodically invoke MRM 21 to perform the re-balancing operations described above, thereby potentially ensuring balanced bandwidth utilization across each of the links of aggregated bundle 22. By ensuring balanced bandwidth utilization, the techniques may promote more efficient use of links in aggregated bundles while also potentially providing for less packet loss and better service with reduced cost savings.

While the example provided in FIG. 3 illustrating FNH selection with respect to unicast traffic, the techniques may be implemented with respect to FNH selection implemented when forwarding multicast traffic, such as IPTV traffic. FNH selection implemented when forwarding multicast traffic may involve replication and other related multicast operations to ensure the traffic is delivered to one or more subscribers that have joined the multicast group associated with the multicast traffic. In these instances, the techniques may be implemented to similarly update the multicast FNH structure. Likewise, the techniques should not be limited to scheduling of IP traffic but may be performed with respect to other forms of traffic, such as multi-protocol label switching (MPLS) traffic.

Moreover, while the techniques are generally described with respect to byte counts, the techniques may be implemented with respect to other counts, such as packet counts. In these instances, the techniques may monitor and maintain in the count table a number of packets sent via each link in a manner substantially similar to that described above with respect to the byte counts. The techniques may then perform the rebalancing with respect to the packet counts in the manner generally described above with respect to byte counts.

Figure 4A:
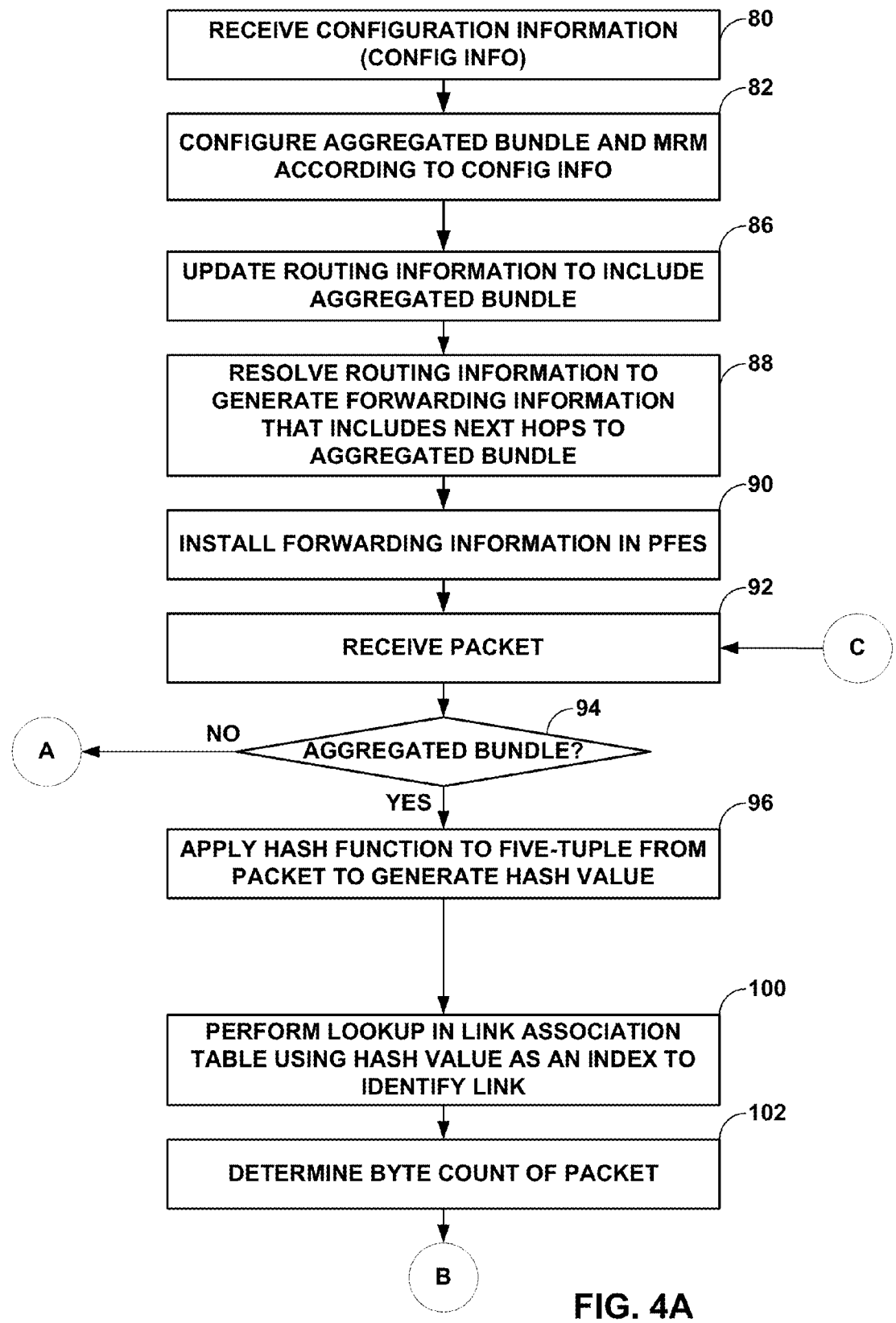
FIG. 4A, 4B are flowcharts illustrating an example mode of operation of a network device in implementing the aggregated bundle scheduling techniques described in this disclosure.
Figure 4B:
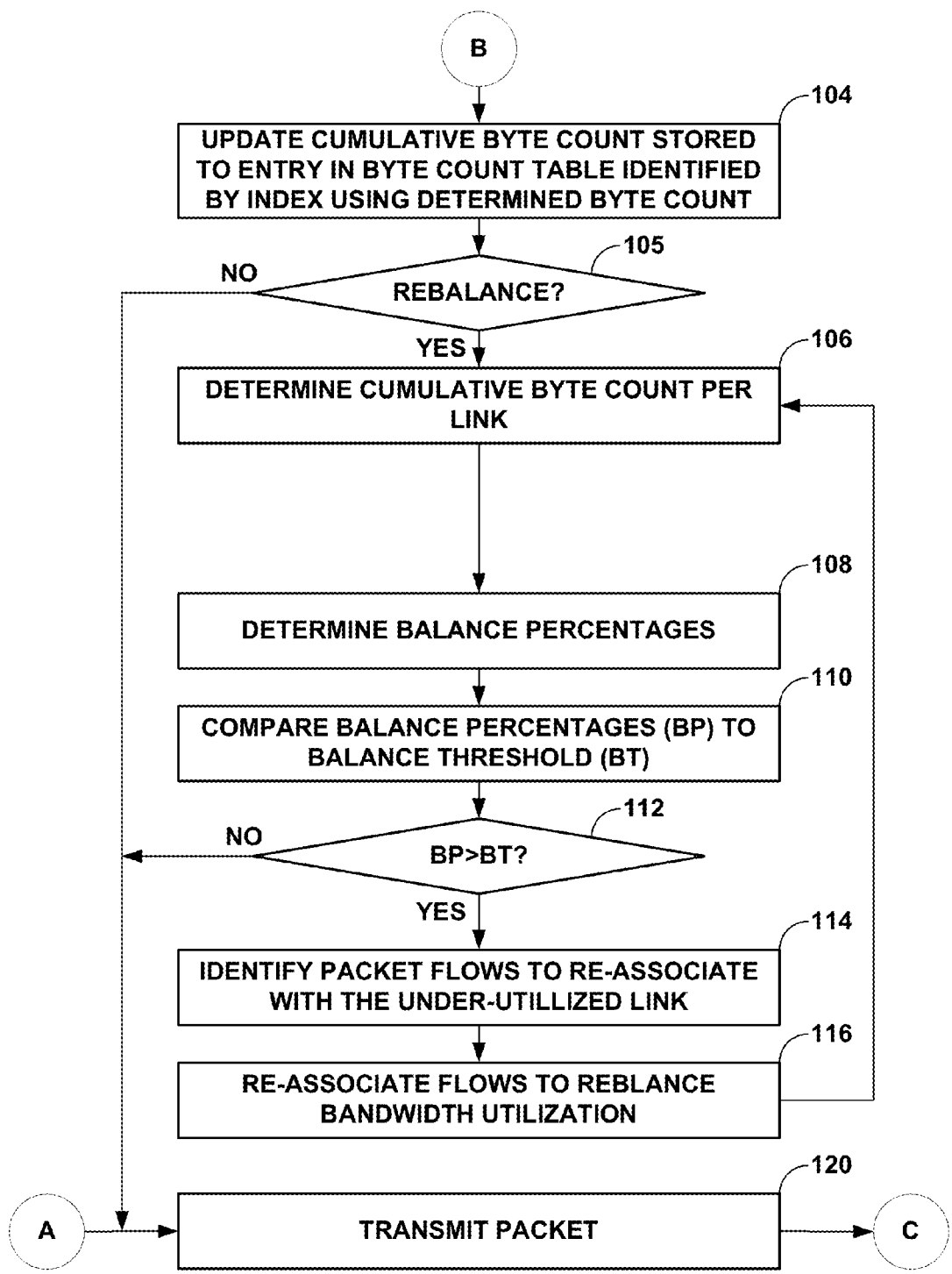

FIGS. 4A, 4B are flowcharts illustrating an example mode of operation of a network device, such as router 18 shown in the examples of FIGS. 2 and 3, in implementing the aggregated bundle scheduling techniques described in this disclosure. Referring first to the example of FIG. 4A, a user or administrator may initially interface with router 18 via UI 46 to specify configuration data 48 for configuring aggregated bundle 21 and MRM 21 (80). Control unit 30 may interface with PFEs 38 to configure aggregated bundle 22 and MRM 21 according to configuration data 48 in the manner described above (82). When configuring aggregated bundle 22, control unit 30 may define hash function 60, link association table 64 and count table 66. Control unit 30 may invoke RE 43 to update the routing information stored to RIB 44 to include aggregated bundle 22 (86). Typically, aggregated bundle 22 is specified as a single virtual link within RIB 44, as opposed to three separate links. This abstraction permits the forwarding plane to perform balancing without interference from the control plane. RE 43 may then, as described above, resolve this updated routing information to generate forwarding information that includes next hops to aggregated bundle 22 (88).

After generating this forwarding information, RE 43 stores this forwarding information to FIB 45. Control unit 30 then installs this forwarding information in PFEs 38 as SW FIB 45' (90). PFEs 38 may then install this SW FIB 45' into hardware to generate HW FIB 56 in the manner described above. PFEs 38 may then begin receiving downstream traffic destined to the subscriber (92). For example, PFE 38' may receive a packet destined for the one of subscriber networks 16 owned and operated by this subscriber and associated with primary logical interface 52A and backup logical interface 52B.

Next, control logic 56 may then extract a five-tuple from this packet and perform a lookup in HW FIB 56 in the manner described above to determine a forwarding next hop (FNH). This FNH may indicate that this packet flow identified by the five-tuple is associated with aggregated bundle 22 or a normal next hop (94). If associated with aggregated bundle 22 ("YES" 94), ASICs 54 apply hash function 60 to the five-tuple from the packet to generate the hash value, as described above (96). ASICs 54 may then use this hash value as an index into LA table 64. ASICs 54 perform a lookup in LA table 64 using the index to identify a link of aggregated bundle 22 to which the packet flow has been assigned (100). ASICs 54 also determine a byte count of the packet, as described above, and update the cumulative byte count stored to an entry of Count table 66 identified by the index using the determined byte count in the manner described above (102; FIG. 4B, 104).

Referring to FIG. 4B, control unit 50 may periodically invoke MRM 21 to rebalance flows across links of aggregated bundle 22 in a manner that balances bandwidth utilization. Assuming control unit 50 has determined that MRM 21 should be invoked, such as upon expiration of a timer ("YES" 105), control unit 50 invokes MRM 21, which determines a cumulative byte count per link in the manner described above (106). Using the total cumulative byte counts per link, MRM 21 computes the above described balance percentages and compares each of the balance percentages to the balance threshold (108). If any one of the comparisons of the balance percentage exceeds the balance threshold ("YES" 112), MRM 21 identifies packet flows to re-associate with the under-utilized link (114). MRM 21 then re-associates the identified flows with the under-utilized link to rebalance bandwidth utilization across the links of aggregated bundle 22 (116). In some instances, MRM 21 may then determine whether each balance percentage has been compared to the balance threshold so as to determine whether it has finished rebalancing the flows. If not finished, MRM 21 may continue in the manner described above to rebalance bandwidth utilization across the links of aggregated bundle 22. If finished or if a maximum number of attempts to re-balance have been reached (where this maximum number of attempts may be configured), MRM 21 may terminate until next invoked.

ASICs 21 may, when the flow is not associated with an aggregated bundle (FIG. 4A, 94), transmit the packet (120). When the flow is associated with an aggregated bundle (FIG. 4A, "NO" 94) and rebalancing is not yet required (FIG. 4B, "NO" 105), ASICs 54 transmit the packet (120). Additionally, even if rebalancing is required (FIG. 4B, "YES" 105), ASICs 54 transmit the packet (120). While shown as being the last operation potentially performed after rebalancing in the example of FIGS. 4A, 4B, ASICs 54 may transmit the packet upon determining the FNH (or in the circumstances of aggregated bundle 22, after determining the byte count of the packet). That is, ASICs 54 may transmit packets prior to performing rebalancing in the manner described above. The steps performed by ASICs 54 may therefore not be performed in the manner illustrated in FIGS. 4A, 4B but may be performed in any conceivable order unless explicitly specified above as required to be performed in the particular order described. Accordingly, the techniques should not be limited to the ordering shown in the examples of FIGS. 4A, 4B.

Figure 5:
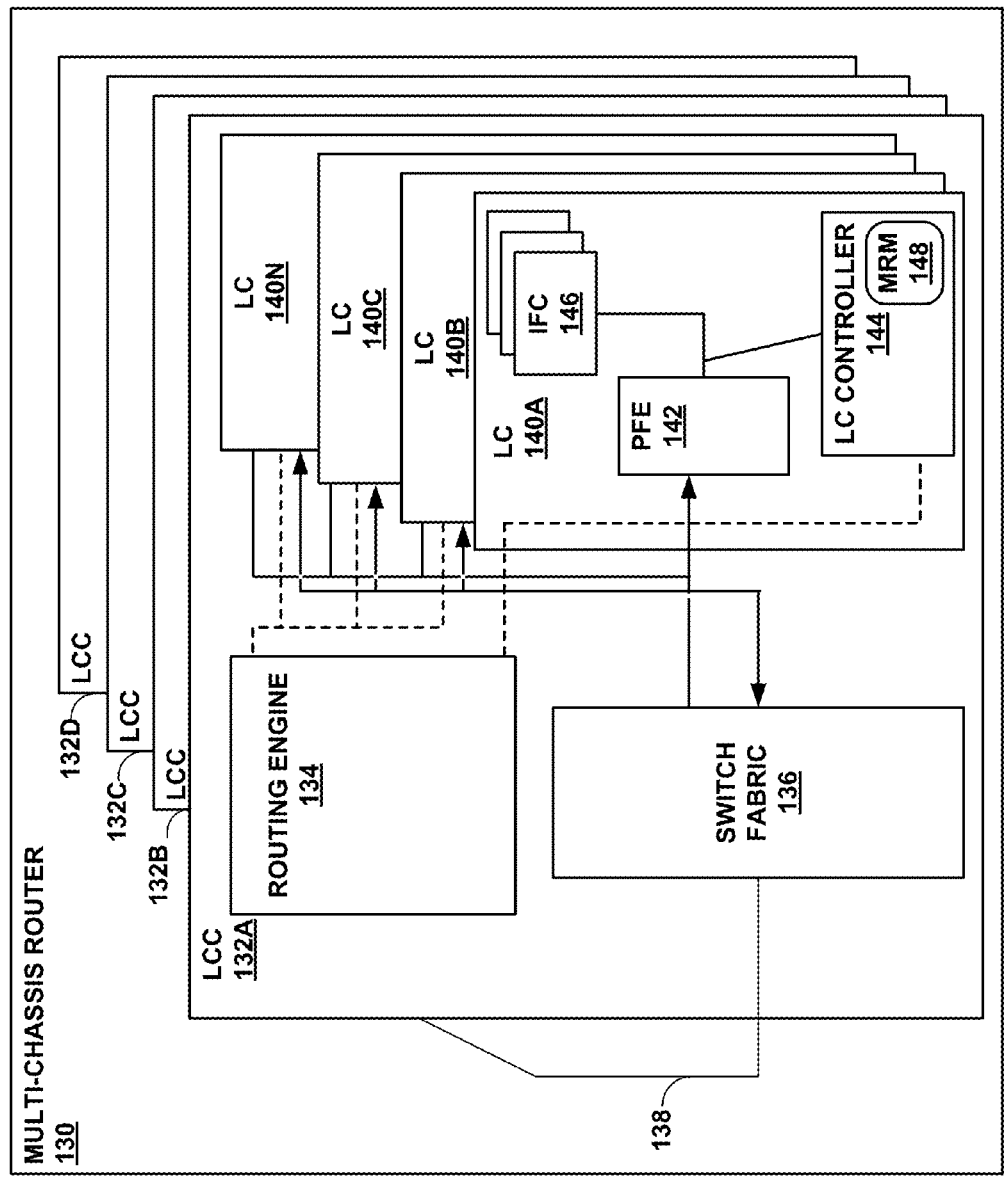
FIG. 5 is a block diagram illustrating an example multi-chassis router that implements the aggregated bundle scheduling techniques described in this disclosure.

FIG. 5 is a block diagram illustrating an example multi-chassis router 130 that implements the aggregated bundle scheduling techniques described in this disclosure. In the example of FIG. 5, multi-chassis router 130 may include a plurality of line card chassis (LCC) 132-132D ("LCCs 132"). Each of LCCs 132 includes a routing engine 134, which may operate in a manner similar to that described above with respect to RE 43 of router 18 shown in the example of FIG. 2. Each LCC 132 also includes a switch fabric 136, which may also function within each of LCCs 132 similar to that described above with respect to switch fabric 34 of router 18 shown in the example of FIG. 2. However, switch fabric 136 may be adapted to enable communication not only within each of LLCs 132, but also between LLCs 132 via inter-chassis switch fabric 138. Inter-chassis switch fabric 138 represents a switch fabric that may be integrated with or separate from switch fabric 136 that enables switching of traffic among LCCs 132, hence the name "inter-chassis switch fabric."

Each of LCCs 132 also include a plurality of LCs 140A-140N ("LCs 140"), which may operate in a manner similar to that of LCs 36 of router 18 shown in the example of FIG. 2. Each of LCs 140 may, similar to LCs 36, include a PFE 142 (which may be similar to PFEs 38), an LC controller 144 (which may operate similar to control logic 56) and one or more interface cards (IFC) 146 ("IFCs 146," which may be similar to interfaces 51). While not shown in the example of FIG. 6, multi-chassis router 130 may include a multi-chassis central control or management module that may ensure routing engines 134 included within LCCs 132 are synchronized or otherwise operating on the same set of routing data. This management module may comprise a control unit similar to control unit 30 of router 18 that may distribute routing information received by multi-chassis router 130 to each of routing engines 134. This multi-chassis management or control module may act as a single point of presence for routing and other control protocols, distributing the routing and other control information to LCCs 132.

The techniques described above may be implemented by multi-chassis router 130. Thus, while described above as being implemented by a single LC 36A, the technique may enable a multi-chassis router 130 to perform bandwidth re-balancing so as to promote more efficient utilization of aggregated bundles 22 that may span multiple chassis (and/or line cards). In the example of FIG. 5, LC controller 144 of LC 140A may include a monitoring and rebalancing module (MRM) 148 ("MRM 148"), which may be substantially similar to MRM 21. MRM 148 may communicate with other MRMs similar to MRM 148 that execute in LCs 140B-140N that monitor other links of an aggregated bundle dispersed across line cards. MRM 148 may also communicate with other MRMs similar to MRM 148 that execute within other line cards of different chassis, LCCs 132B-132D.

The various ones of MRMs 148 may communicate their count tables so that each of the MRMs 148 may determine total byte counts per link of the aggregated bundle. In this implementation, each of the MRMs 148 may perform virtually the same or substantially the same algorithm for re-assigning flows. In this way, each of MRMs 148 identifies the same flows for re-association and then collectively re-configures their respective LA tables to accommodate the re-association of the flows.

In some implementations, one of MRMs 148 may be designated as the master MRM, which is responsible for determining the total byte counts per line of the aggregated bundle and then re-associating one or more flows to other links of the aggregated bundle. The one of MRMs 148 designated as the master may request, periodically, the count table from each of the other ones of MRMs 148. This master MRM 148 may then compute the total byte counts per link and communicate with the other ones of MRMs 148 directions or instructions for re-associating flows with different ones of the links or lines of the aggregated bundle. In this way, the techniques may be implemented within the context of network devices having multiple line cards or even multiple chassis.

While multi-chassis router 130 may represent a single concentrated routing device, multi-chassis router 130 may represent a distributed router 130 in which the various chassis of router 130 may be dispersed among many different routers. In these instances, switch fabric 136 may be replaced with a network connection that interconnects the dispersed chassis, operating in a sense as a virtual switch fabric. These chassis may be virtualized or physical chassis in the sense that physical chassis may be present within a concentrated multi-chassis router or virtualized when various dispersed router chassis are interconnected to form a virtual multi-chassis router. The techniques may be implemented with respect to either of these forms of multi-chassis routers. Virtual multi-chassis routers may promote further forms of redundancy as the virtual chassis may be dispersed geographically, thereby enabling persistent connectivity despite local geographical issues, such as power outages, earthquakes, hurricanes and other issues that may impact one geographical area and not another.

Figure 6:
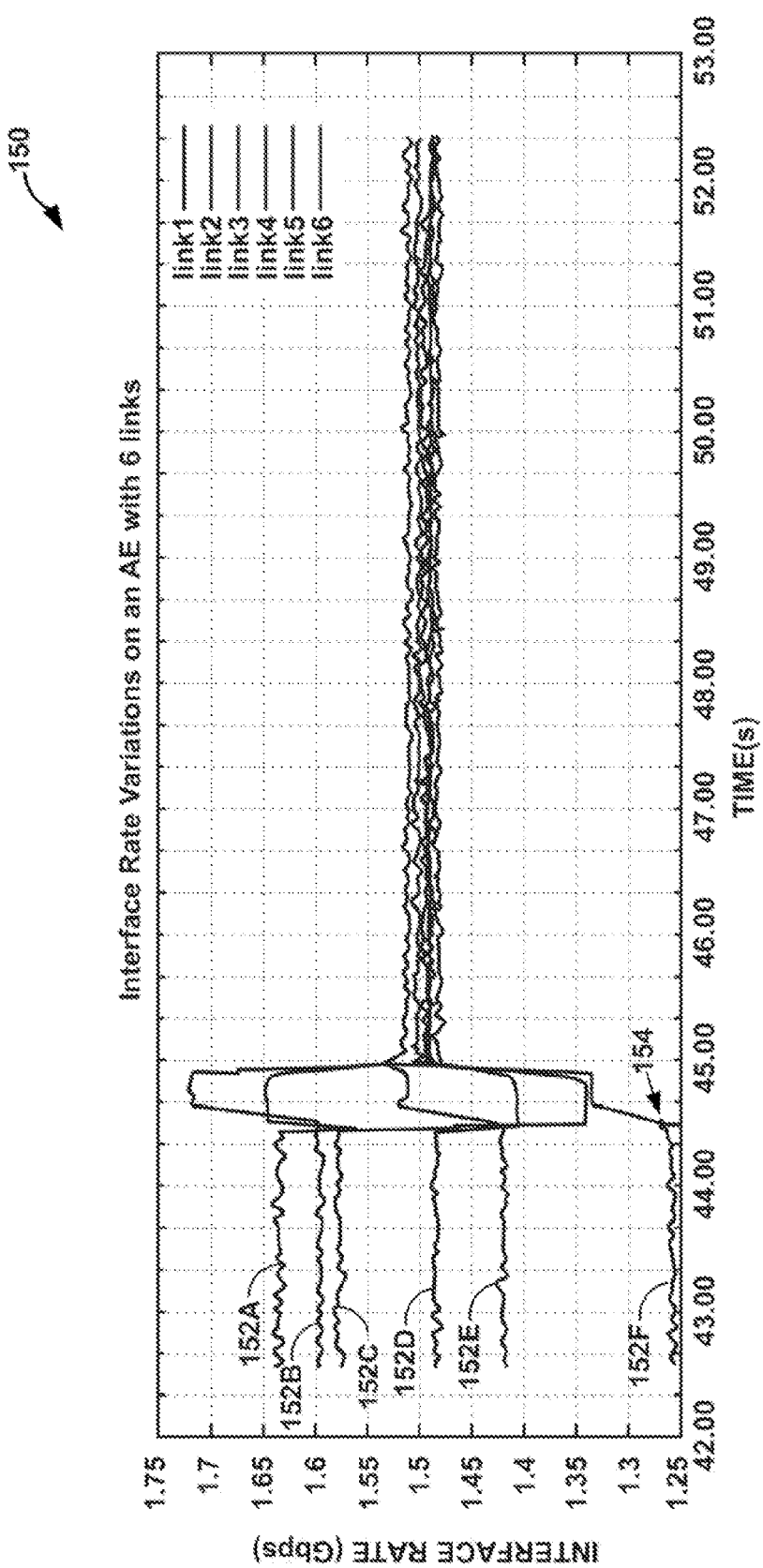
FIG. 6 is a graph illustrating exemplary operation of a device that implements the aggregated bundle scheduling techniques described in this disclosure.

FIG. 6 is a graph 150 illustrating exemplary operation of a device that implements the aggregated bundle scheduling techniques described in this disclosure. In the example of FIG. 7, graph 150 includes an x-axis that denotes time in second and a y-axis that denotes interface rate in gigabits per second (Gbps). Each of lines 152A-152F represent interface rate over time for a respective six interfaces that form a LAG bundle, such as LAG 22. Initially, the interface represented by line 152A is operating at approximately 1.65 Gbps while the interface represented by line 152F is operating at approximately 1.25 Gbps with the other interfaces represented by lines 152B-152E are operating at various rates between 1.65 and 1.25. At point 154, the device began operating in accordance with the techniques described in this disclosure. Within a couple of seconds after point 154, each of lines 152A-152F converge within the tolerance or threshold percentage at approximately 1.5 Gbps, reflecting the balanced aspect of the techniques described above. In this manner, the techniques may balance the data across the links of a LAG bundle.

Various embodiments of the invention have been described. These and other embodiments are within the scope of the following claims.

The invention claimed is:

1. A method comprising:
   associating, with a data plane of a network device, packet flows of packets with different links of an aggregated bundle of two or more links;
   transmitting, with the data plane of the network device, the packets of the packet flows via the different links of the aggregated bundle of two or more links with which the packets are associated;
   monitoring, with the data plane of the network device, the transmission of the packets via each of the corresponding links of the aggregated bundle of two or more links to determine a representation of an amount of data sent per each of the links of the aggregated bundle of two or more links;
   calculating a balance percentage as a function of the amount of data sent per link for a first link of the aggregated bundle of two or more links and the amount of data sent per link for a second link of the aggregated bundle of two or more links;
   determining, with the data plane of the network device, that the bandwidth utilization does not conform to a desired utilization of each of the links of the aggregated bundle of two or more links when the balance percentage is greater than a balance threshold; and
   re-associating, with the data plane of the network device, at least one of the packet flows with a different link of the aggregated bundle of the two or more links based on the determination that the bandwidth utilization does not conform to the desired utilization of each of the links of the aggregated bundle of two or more links.

2. The method of claim 1, monitoring the transmission of the packets comprises monitoring the transmission of the packets to determine a cumulative byte-count representative of the amount of data sent per link of the aggregated bundle of two or more links or a cumulative number of packets representative of the amount of data sent per link of the aggregated bundle of two or more links.

3. The method of claim 1, wherein associating the packet flows of packets comprises hashing a header of the packets to determine a hash value that identifies the different links of the aggregated bundle of two or more links to which the packet flow is associated, and wherein the header identifies the one of the packet flows to which each of the packets corresponds.

4. The method of claim 1,
   wherein associating the packet flows comprises applying a hash function to a header of each of the packets to generate a corresponding hash value, wherein the header identifies the one of the packet flows to which each of the packets corresponds, and wherein the hash value comprises an index into a link association table that includes a plurality of entries that are associated with the links of the aggregated bundle of two or more links,
   wherein monitoring the transmission of the packets comprises:
   determining a byte-count for each of the packets; and
   updating a byte-count table having a same number of entries as the link association table with the determined byte-counts for each of the packets, wherein the entries of the byte-count data each stores a cumulative byte-count representative of a portion of the amount of data sent via the link of the aggregated bundle of two or more links identified by a corresponding entry in the link association table; and adding the cumulative byte-counts so as to determine the amount of data sent per link of the aggregated bundle of two or more links.

5. The method of claim 4, wherein re-associating the at least one of the packet flows with the different link of the aggregated bundle of the two or more links comprises:
identifying one or more entries of the link association table that correspond to one or more entries in the determined byte-count table such that if re-associated with the different link of the aggregated bundle of two or more links would result in more balanced bandwidth utilization across the links of the aggregated bundle of two or more links; and
updating the identified one or more entries of the link association table to re-associate the at least one of the packet flows with the different link of the aggregated bundle of the two or more links based on the determination that the bandwidth utilization does not conform to the desired utilization.

6. The method of claim 4, further comprising:
presenting a user interface with a control plane of the network device by which to receive commands to configure the aggregated bundle of two or more links within the data plane of the network device;
installing, with the control plane of the network device, the byte-count table and the link association table in the data plane of the network device in response to receiving the commands to configure the aggregated bundle of two or more links via the presented user interface.

7. The method of claim 1, wherein re-associating the at least one of the packet flows comprises periodically re-associating the at least one of the packet flows to the different link of the aggregated bundle of the two or more links based on the determination that the bandwidth utilization does not conform to the desired utilization.

8. The method of claim 7,
wherein monitoring the transmission of the packets comprises monitoring the transmission of the packets via each of the corresponding assigned link of the aggregated bundle of two or more links to determine a cumulative packet count or a cumulative byte-count for each of the aggregate bundle of two or more links, and
wherein each of the cumulative byte-counts or each of the cumulative packet count is representative of the amount of data sent per a corresponding link of the aggregated bundle of two or more links.

9. The method of claim 1, further comprising:
presenting a user interface by which to receive a command to present load balancing statistics specifying one or more statistics with regard to distribution of the packets over the links of the aggregated bundle of two or more links; and
presenting via the user interface the load balancing statistics in response to receiving the command to present load balancing statistics.

10. A network device comprising:
at least one interface that receives packets associated with packet flows; and
a data plane that associates each of the packet flows with a different one of an aggregated bundle of two or more links,
wherein the at least one interface transmits the packets of the packet flows via the associated link of the aggregated bundle of two or more links, and
wherein the data plane monitors the transmission of the packets via each of the associated links of the aggregated bundle of two or more links to determine a representation of an amount of data sent per link of the aggregated bundle of two or more links, calculates a balance percentage as a function of the amount of data sent per link for a first link of the aggregated bundle of two or more links and the amount of data sent per link for a second link of the aggregated bundle of two or more links, determines that bandwidth utilization does not conform to a desired bandwidth utilization of each of the links of the aggregated bundle of two or more when the balance percentage is greater than a balance threshold, and re-associates at least one of the packet flows to a different link of the aggregated bundle of the two or more links based on the determination that the bandwidth utilization does not conform to the desired bandwidth utilization of each of the links of the aggregated bundle of two or more links.

11. The network device of claim 10, wherein the data plane, in monitoring the transmission of the packets, monitors the transmission of the packets to determine a cumulative byte-count representative of the amount of data sent per link of the aggregated bundle of two or more links or a cumulative number of packets representative of the amount of data sent per link of the aggregated bundle of two or more links.

12. The network device of claim 10, wherein the data plane, in associating the packet flows of packets, hashes a header of the packets to determine a hash value that identifies the different links of the aggregated bundle of two or more links to which the packet flow is associated, and wherein the header identifies the one of the packet flows to which each of the packets corresponds.

13. The network device of claim 10,
wherein the data plane, in associating the packet flows, applies a hash function to a header of each of the packets to generate a corresponding hash value, wherein the header identifies the one of the packet flows to which each of the packets corresponds, and wherein the hash value comprises an index into a link association table that includes a plurality of entries that are associated with the links of the aggregated bundle of two or more links,
wherein the data plane, in monitoring the transmission of the packets, determines a byte-count for each of the packets and updates a byte-count table having a same number of entries as the link association table with the determined byte-counts for each of the packets, wherein the entries of the byte-count data each stores a cumulative byte-count representative of a portion of the amount of data sent via the link of the aggregated bundle of two or more links identified by a corresponding entry in the link association table, and adds the cumulative byte-counts so as to determine the amount of data sent per link of the aggregated bundle of two or more links.

14. The network device of claim 13, wherein the data plane, in re-associating the at least one of the packet flows with the different link of the aggregated bundle of the two or more links, identifies one or more entries of the link association table that correspond to one or more entries in the determined byte-count table such that if re-associated with the different link of the aggregated bundle of two or more links would result in more balanced bandwidth utilization across the links of the aggregated bundle of two or more links and updates the identified one or more entries of the link association table to re-associate the at least one of the packet flows with the different link of the aggregated bundle of the two or more links based on the determination that the bandwidth utilization does not conform to the desired utilization.

15. The network device of claim 13, further comprising a control plane that presents a user interface by which to receive commands to configure the aggregated bundle of two or more links within the data plane of the network device and installs the byte-count table and the link association table in the data plane of the network device in response to receiving the commands to configure the aggregated bundle of two or more links via the presented user interface.

16. The network device of claim 10, wherein the data plane, in re-associating the at least one of the packet flows, periodically re-associating the at least one of the packet flows to the different link of the aggregated bundle of the two or more links based on the determination that the bandwidth utilization does not conform to the desired utilization.

17. The network device of claim 16,
wherein the data plane, in monitoring the transmission of the packets, monitors the transmission of the packets via each of the corresponding assigned link of the aggregated bundle of two or more links to determine a cumulative packet count or a cumulative byte-count for each of the aggregate bundle of two or more links, and
wherein each of the cumulative byte-counts or each of the cumulative packet count is representative of the amount of data sent per a corresponding link of the aggregated bundle of two or more links.

18. The network device of claim 10, further comprising a control plane that presents a user interface by which to receive a command to present load balancing statistics specifying one or more statistics with regard to distribution of the packets over the links of the aggregated bundle of two or more links and presents via the user interface the load balancing statistics in response to receiving the command to present load balancing statistics.

19. A non-transitory computer-readable medium comprising instructions that, when executed cause one or more processors of a network device to:
associate packet flows of packets to different links of an aggregated bundle of two or more links;
transmit the packets of the packet flows via the associated different links of the aggregated bundle of two or more links;
monitor the transmission of the packets via each of the corresponding assigned link of the aggregated bundle of two or more links to determine a representation of an amount of data sent per link of the aggregated bundle of two or more links;
calculate a balance percentage as a function of the amount of data sent per link for a first link of the aggregated bundle of two or more links and the amount of data sent per link for a second link of the aggregated bundle of two or more links;
determine that bandwidth utilization is unbalanced between the aggregated bundle of two or more links when the balance percentage is greater than a balance threshold; and
re-associate at least one of the packet flows with a different link of the aggregated bundle of the two or more links based on the determination that the bandwidth utilization is unbalanced.

20. A method comprising:
associating, with a data plane of a network device, packet flows of packets with different links of an aggregated bundle of two or more links based on application of a hash function to a header of each of the packets associated with packet flows to generate a corresponding hash value, wherein the header identifies the one of the packet flows to which each of the packets corresponds, and wherein the hash value comprises an index into a link association table that includes a plurality of entries that are associated with the links of the aggregated bundle of two or more links,
transmitting, with the data plane of the network device, the packets of the packet flows via the different links of the aggregated bundle of two or more links with which the packets are associated;
determining a byte-count for each of the packets; and
updating a byte-count table having a same number of entries as the link association table with the determined byte-counts for each of the packets, wherein the entries of the byte-count data each stores a cumulative byte-count representative of a portion of an amount of data sent via the link of the aggregated bundle of two or more links identified by a corresponding entry in the link association table;
adding the cumulative byte-counts so as to determine the amount of data sent per link of the aggregated bundle of two or more links;
determining, with the data plane of the network device, that the bandwidth utilization does not conform to a desired utilization of each of the links of the aggregated bundle of two or more links based on a comparison of the amounts of data sent per link of the aggregated bundle of two or more links to one another; and
re-associating, with the data plane of the network device, at least one of the packet flows with a different link of the aggregated bundle of the two or more links based on the determination that the bandwidth utilization does not conform to the desired utilization of each of the links of the aggregated bundle of two or more links.

* * * * *